United States Patent
Mirza et al.

(10) Patent No.: US 10,535,178 B2
(45) Date of Patent: Jan. 14, 2020

(54) SHADER WRITES TO COMPRESSED RESOURCES

(71) Applicants: Advanced Micro Devices, Inc., Sunnyvale, CA (US); ATI Technologies ULC, Markham (CA)

(72) Inventors: Jimshed Mirza, Toronto (CA); Christopher J. Brennan, Holden, MA (US); Anthony Chan, Richmond Hill (CA); Leon Lai, Richmond Hill (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 3 days.

(21) Appl. No.: 15/389,075

(22) Filed: Dec. 22, 2016

(65) Prior Publication Data
US 2018/0182155 A1    Jun. 28, 2018

(51) Int. Cl.
*G06T 15/50* (2011.01)
*G06T 15/00* (2011.01)
*G06F 12/0875* (2016.01)
*G06T 15/04* (2011.01)
*G06T 15/80* (2011.01)

(52) U.S. Cl.
CPC ........ *G06T 15/005* (2013.01); *G06F 12/0875* (2013.01); *G06T 15/04* (2013.01); *G06T 15/80* (2013.01); *G06F 2212/1016* (2013.01); *G06F 2212/302* (2013.01); *G06F 2212/401* (2013.01)

(58) Field of Classification Search
CPC ......... G06T 9/00; G06T 15/04; G06T 15/005; G06T 15/80
USPC ........................................................ 345/426
See application file for complete search history.

(56) References Cited

U.S. PATENT DOCUMENTS

| | | |
|---|---|---|
| 6,108,460 A | 8/2000 | Rich |
| 6,243,081 B1 | 6/2001 | Goris et al. |
| 6,452,602 B1 | 9/2002 | Morein et al. |
| 6,959,110 B1 | 10/2005 | Danskin et al. |
| 7,042,462 B2 | 5/2006 | Kim et al. |
| 7,239,322 B2 | 7/2007 | Lefebvre et al. |
| 7,719,540 B2 | 5/2010 | Piazza et al. |

(Continued)

OTHER PUBLICATIONS

European Search Report in European Application No. 17150171.1, dated Jul. 26, 2017, 4 pages.

(Continued)

*Primary Examiner* — Charles Tseng
(74) *Attorney, Agent, or Firm* — Meyertons Hood Kivlin Kowert and Goetzel PC; Rory D. Rankin

(57) ABSTRACT

Systems, apparatuses, and methods for performing shader writes to compressed surfaces are disclosed. In one embodiment, a processor includes at least a memory and one or more shader units. In one embodiment, a shader unit of the processor is configured to receive a write request targeted to a compressed surface. The shader unit is configured to identify a first block of the compressed surface targeted by the write request. Responsive to determining the data of the write request targets less than the entirety of the first block, the first shader unit reads the first block from the cache and decompress the first block. Next, the first shader unit merges the data of the write request with the decompressed first block. Then, the shader unit compresses the merged data and writes the merged data to the cache.

20 Claims, 8 Drawing Sheets

(56) References Cited

U.S. PATENT DOCUMENTS

| | | | |
|---|---|---|---|
| 8,174,534 B2 | 5/2012 | Jiao | |
| 8,295,621 B1* | 10/2012 | Diard | G06T 11/40 382/232 |
| 8,643,659 B1* | 2/2014 | Baldwin | G06T 1/60 345/557 |
| 9,819,970 B2* | 11/2017 | Sermadevi | H04N 19/91 |
| 2007/0011432 A1 | 1/2007 | Tuuk et al. | |
| 2009/0189909 A1* | 7/2009 | Jiao | G06T 1/60 345/506 |
| 2012/0320067 A1* | 12/2012 | Iourcha | G06T 9/00 345/501 |
| 2015/0026438 A1* | 1/2015 | Giroux | G06F 9/38 712/225 |
| 2015/0070380 A1* | 3/2015 | Lum | G06T 15/503 345/612 |
| 2015/0070381 A1* | 3/2015 | Lum | G06T 9/00 345/612 |
| 2016/0300320 A1* | 10/2016 | Iourcha | G06T 9/00 |
| 2017/0186224 A1* | 6/2017 | Diard | G06T 15/80 |
| 2017/0256024 A1* | 9/2017 | Abraham | G06T 15/04 |
| 2017/0256025 A1* | 9/2017 | Abraham | G06T 15/04 |
| 2017/0278215 A1* | 9/2017 | Appu | G06T 1/20 |
| 2017/0287209 A1* | 10/2017 | Gierach | G06T 1/20 |
| 2018/0089091 A1* | 3/2018 | Akenine-Moller | G06F 12/0875 |
| 2018/0314528 A1 | 11/2018 | Zhu et al. | |

OTHER PUBLICATIONS

Communication pursuant to Article 94(3) EPC in European Application No. 17150171.1, dated Jan. 15, 2018, 4 pages.

Akenine-Möller, et al., "6.3 Procedural Texturing", Real-Time Rendering, pp. 178-180, Third Edition, Jul. 31, 2008, CRC Press.

Akenine-Möller, et al., "Graphics Processing Units for Handhelds", Proceedings of the IEEE, May 2008, pp. 779-789, vol. 96, Issue 5, IEEE, New York, NY, USA.

International Search Report and Written Opinion in International Application No. PCT/US2012/042442, dated Oct. 31, 2012, 11 pages.

Woo et al., "A 195mW, 9.1 MVertices/s Fully Programmable 3-D Graphics Processor for Low-Power Mobile Devices", IEEE Journal of Solid-State Circuits, Nov. 19, 2008, pp. 2370-2380, vol. 43, No. 11, IEEE, Piscataway, NJ, USA.

Communication pursuant to Article 94(3) EPC in European Application No. 17150171.1, dated Jul. 25, 2018, 3 pages.

International Search Report and Written Opinion in International Application No. PCT/US2017/067697, dated Mar. 20, 2018, 10 pages.

Non-Final Office Action in U.S. Appl. No. 15/607,118, dated Feb. 26, 2019, 13 pages.

* cited by examiner

SHADER WRITES TO COMPRESSED RESOURCES

BACKGROUND

Description of the Related Art

A graphics processing unit (GPU) is a complex integrated circuit that is configured to perform graphics-processing tasks. For example, a GPU can execute graphics-processing tasks required by an end-user application, such as a video-game application. The GPU can be a discrete device or can be included in the same device as another processor, such as a central processing unit (CPU). A GPU produces the pixels that make up an image from a higher level description of its components in a process known as rendering. GPUs typically utilize a concept of continuous rendering by the use of computing elements to process pixel, texture, and geometric data. The computing elements can execute the functions of rasterizers, setup engines, color blenders, hidden surface removal, texture mapping, etc. These computing elements are often referred to as shaders, shader processors, shader arrays, shader units, shader engines, etc., with "shader" being a term in computer graphics referring to a set of software instructions or a program used by a graphics resource to perform rendering effects. "Shader" can also refer to an actual hardware component or processor used to execute software instructions. A shader processor or program can read and render data and perform any type of processing of the data.

Much of the processing involved in generating complex graphics scenes involves texture data. Textures can be any of various types of data, such as color, transparency, lookup tables, or other data. In some embodiments, textures can be digitized images to be drawn onto geometric shapes to add visual detail. A large amount of detail, through the use of textures, can be mapped to the surface of a graphical model as the model is rendered to create a destination image. The purpose of texture mapping is to provide a realistic appearance on the surface of objects. Textures can specify many properties, including colors, surface properties like specular reflection or fine surface details in the form of normal or bump maps. A texture can also be image data, color or transparency data, roughness/smoothness data, reflectivity data, etc.

In 3D computer graphics, surface detail on objects is commonly added through the use of textures. For example, a 2D bitmap image of a brick wall can be applied, using texture mapping, to a set of polygons representing a 3D model of a building to give the 3D rendering of that object the appearance that it is made of bricks. Providing realistic computer graphics typically requires many high-quality, detailed textures. The use of textures can consume large amounts of storage space and bandwidth, and consequently textures can be compressed to reduce storage space and bandwidth utilization.

Compressing textures and surfaces can reduce storage and bandwidth costs on the graphics system while retaining as much of the quality of the original textures and surfaces as possible. One of the challenges of graphics processing is that memory or cache bandwidth is limiting the GPU from reaching its full capabilities. Compression can be utilized to decrease the amount of data fetched from memory or cache for processing by the GPU. When the GPU generates an output image or depth/stencil surfaces, the GPU can compress these surfaces to reduce the memory/cache bandwidth and utilization. A software application can post process these surfaces before sending the final image to the display. Typically, the software application will decompress the entire output image prior to updating any part of the output image. However, in a scene being rendered by the GPU, sometimes only a portion of a scene needs to be updated as the scene changes over time. For example, in a video game application, a user can shoot at a wall, creating bullet holes in the wall. To update the surface representing the wall, only small portions of the wall need to be updated. However, the process for updating portions of a compressed resource can be inefficient. Accordingly, improved techniques for managing compressed resources are desired.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for performing shader writes to compressed resources are disclosed. In one embodiment, a processor includes at least a cache and one or more shader units. In one embodiment, a first shader unit of the processor is configured to receive a write request targeted to a compressed surface. The first shader unit is configured to identify a first block of the compressed surface targeted by the write request. The first shader is also configured to determine if data of the write request targets less than an entirety of the first block. If the first shader unit determines that the data of the write request targets less than the entirety of the first block, the first shader unit reads the first block from the cache and decompresses the first block. Next, the first shader unit merges the data of the write request with the decompressed first block. Then, the shader unit compresses the merged data and writes the merged data to the cache. In one embodiment, if the first shader unit determines that the data of the write request updates the entirety of the first block, the first shader unit compresses the data of the write request and then overwrites the first block in the cache with the compressed data.

In one embodiment, the first shader unit is configured to access metadata associated with the first block, wherein the metadata includes information specifying a type of compression used to compress the first block. In one embodiment, the metadata is stored in a metadata cache. The first shader unit is configured to utilize the information to decompress the first block. In one embodiment, the first shader unit is configured to determine if the first block is set to a constant value. If the first block is set to a constant value, the first shader unit can skip reading the first block from the cache. Instead, the first shader unit merges the data of the write request with data of the constant value. Then, the first shader unit compresses and writes the merged data to the cache.

Figure 1:
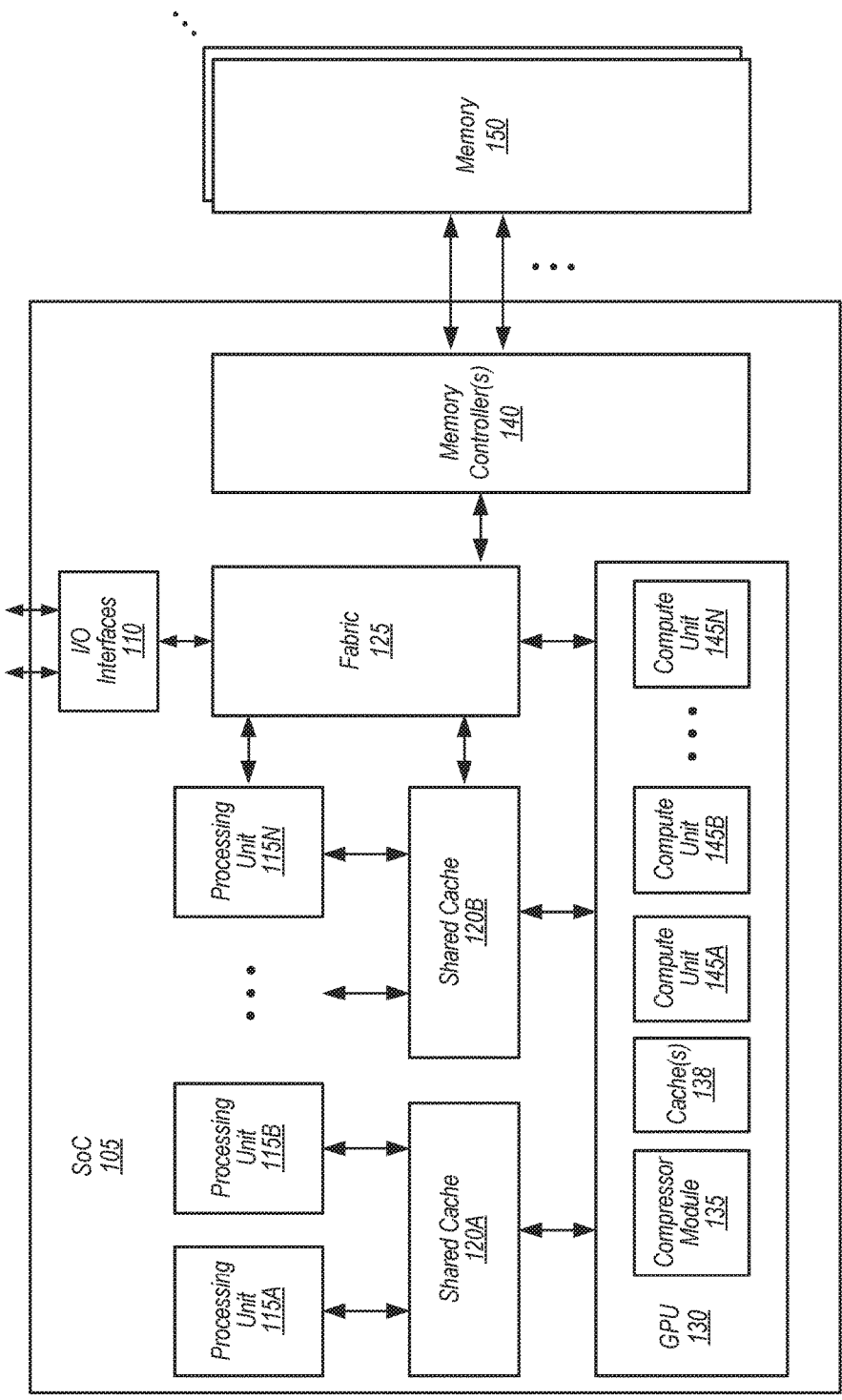
FIG. 1 is a block diagram of one embodiment of a computing system.

Referring now to FIG. 1, a block diagram of one embodiment of a computing system 100 is shown. In one embodiment, computing system 100 includes system on chip (SoC) 105 coupled to memory 150. SoC 105 can also be referred to as an integrated circuit (IC). In one embodiment, SoC 105 includes processing units 115A-N, input/output (I/O) interfaces 110, shared caches 120A-B, fabric 125, graphics processing unit 130, and memory controller(s) 140. SoC 105 can also include other components not shown in FIG. 1 to avoid obscuring the figure. Processing units 115A-N are representative of any number and type of processing units. In one embodiment, processing units 115A-N are central processing unit (CPU) cores. In another embodiment, one or more of processing units 115A-N are other types of processing units (e.g., application specific integrated circuit (ASIC), field programmable gate array (FPGA), digital signal processor (DSP)). Processing units 115A-N are coupled to shared caches 120A-B and fabric 125.

In one embodiment, processing units 115A-N are configured to execute instructions of a particular instruction set architecture (ISA). Each processing unit 115A-N includes one or more execution units, cache memories, schedulers, branch prediction circuits, and so forth. In one embodiment, the processing units 115A-N are configured to execute the main control software of system 100, such as an operating system. Generally, software executed by processing units 115A-N during use can control the other components of system 100 to realize the desired functionality of system 100. Processing units 115A-N can also execute other software, such as application programs.

GPU 130 includes compressor module 135, cache(s) 138, and compute units 145A-N which are representative of any number and type of compute units that are used for graphics or general-purpose processing. GPU 130 is coupled to shared caches 120A-B and fabric 125. In one embodiment, GPU 130 is configured to execute graphics pipeline operations such as draw commands, pixel operations, geometric computations, and other operations for rendering an image to a display. In another embodiment, GPU 130 is configured to execute operations unrelated to graphics. In a further embodiment, GPU 130 is configured to execute both graphics operations and non-graphics related operations.

In one embodiment, GPU 130 is configured to perform write operations to compressed surfaces stored in a cache 138. In one embodiment, for a write request to a portion of a block of a compressed surface, GPU 130 is configured to merge the data of the write request with the other portions of the block. Then, GPU 130 uses compressor module 135 to compress the merged data and then GPU 130 writes the compressed data to a cache 138. In one embodiment, in response to receiving a write request, GPU 130 is configured to determine if the write request targets a compressed block of a surface. If the write request targets an uncompressed block of the surface, then GPU 130 skips the decompression step and merges the data of the write request with the uncompressed block. The size of each block can vary from embodiment to embodiment.

I/O interfaces 110 are coupled to fabric 125, and I/O interfaces 110 are representative of any number and type of interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 110. Such peripheral devices include (but are not limited to) displays, keyboards, mice, printers, scanners, joysticks or other types of game controllers, media recording devices, external storage devices, network interface cards, and so forth.

SoC 105 is coupled to memory 150, which includes one or more memory modules. Each of the memory modules includes one or more memory devices mounted thereon. In some embodiments, memory 150 includes one or more memory devices mounted on a motherboard or other carrier upon which SoC 105 is also mounted. In one embodiment, memory 150 is used to implement a random access memory (RAM) for use with SoC 105 during operation. The RAM implemented can be static RAM (SRAM), dynamic RAM (DRAM), Resistive RAM (ReRAM), Phase Change RAM (PCRAM), or any other volatile or non-volatile RAM. The type of DRAM that is used to implement memory 150 includes (but is not limited to) double data rate (DDR) DRAM, DDR2 DRAM, DDR3 DRAM, and so forth. Although not explicitly shown in FIG. 1, SoC 105 can also include one or more cache memories that are internal to the processing units 115A-N and/or compute units 145A-N. In some embodiments, SoC 105 includes shared caches 120A-B that are utilized by processing units 115A-N and compute units 145A-N. In one embodiment, caches 120A-B are part of a cache subsystem including a cache controller.

In various embodiments, computing system 100 can be a computer, laptop, mobile device, server or any of various other types of computing systems or devices. It is noted that the number of components of computing system 100 and/or SoC 105 can vary from embodiment to embodiment. There can be more or fewer of each component/subcomponent than the number shown in FIG. 1. For example, in another embodiment, SoC 105 can include multiple memory controllers coupled to multiple memories. It is also noted that computing system 100 and/or SoC 105 can include other components not shown in FIG. 1. Additionally, in other embodiments, computing system 100 and SoC 105 can be structured in other ways than shown in FIG. 1.

Figure 2:
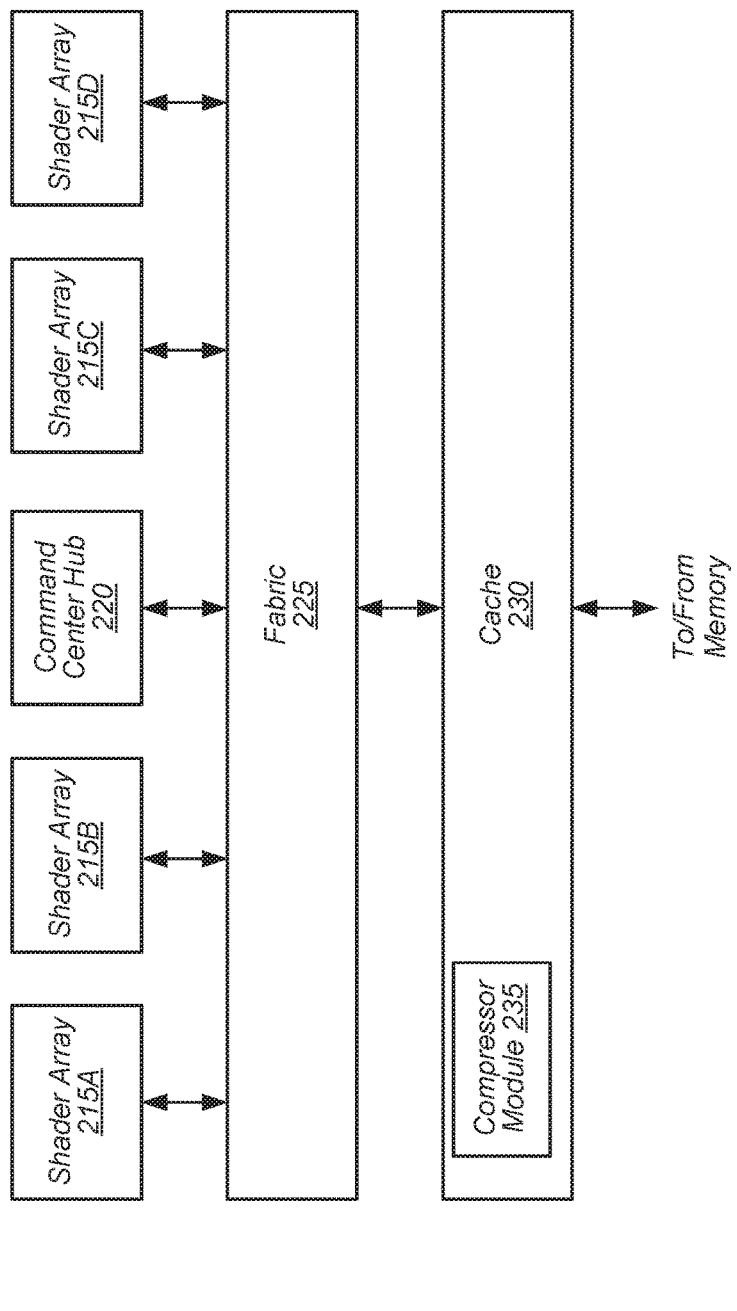
FIG. 2 is a block diagram of one embodiment of a GPU.

Turning now to FIG. 2, a block diagram of one embodiment of a graphics processing unit (GPU) 200 is shown. In one embodiment, the logic of GPU 200 is included in GPU 130 (of FIG. 1). In one embodiment, GPU 200 includes at least shader arrays 215A-D, command center hub 220, fabric 225, and cache 230. It is noted that GPU 200 also includes other logic and/or other components which are not shown in FIG. 2 to avoid obscuring the figure. It is also noted that the structure of GPU 200 is merely one example of a structure which is used in one embodiment. In other embodiments, GPU 200 can be organized in other manners.

Shader arrays 215A-D are representative of any number and type of shader compute resources which are included in GPU 200. Shader arrays 215A-D can also be referred to as "shader units". Each shader array 215A-D includes various compute resources for performing geometry, vertex, pixel, and/or other shading operations to render graphics. In various embodiments, the compute resources include components for fetching and decoding instructions, one or more arithmetic logic units "ALUs" for performing arithmetic calculations, and other resources. Although not shown in FIG. 2, each shader array 215A-D can include a level one (L1) cache. Shader arrays 215A-D are coupled to cache 230 via fabric 225. In one embodiment, cache 230 is a level two (L2) cache. Depending on the embodiment, cache 230 is coupled to a memory (not shown) or another level of cache (not shown). Command center hub 220 is representative of any number and type of command processors, schedulers, and other command processing resources.

In one embodiment, compressor module 235 is located within cache 230. In another embodiment, compressor module 235 is located within fabric 225. In one embodiment, when GPU 200 processes a write request to a surface, compressor module 230 is configured to merge the data of the write request with the uncompressed data of the targeted block of the surface. Then, the merged data is compressed and written back to cache 230.

Figure 3:
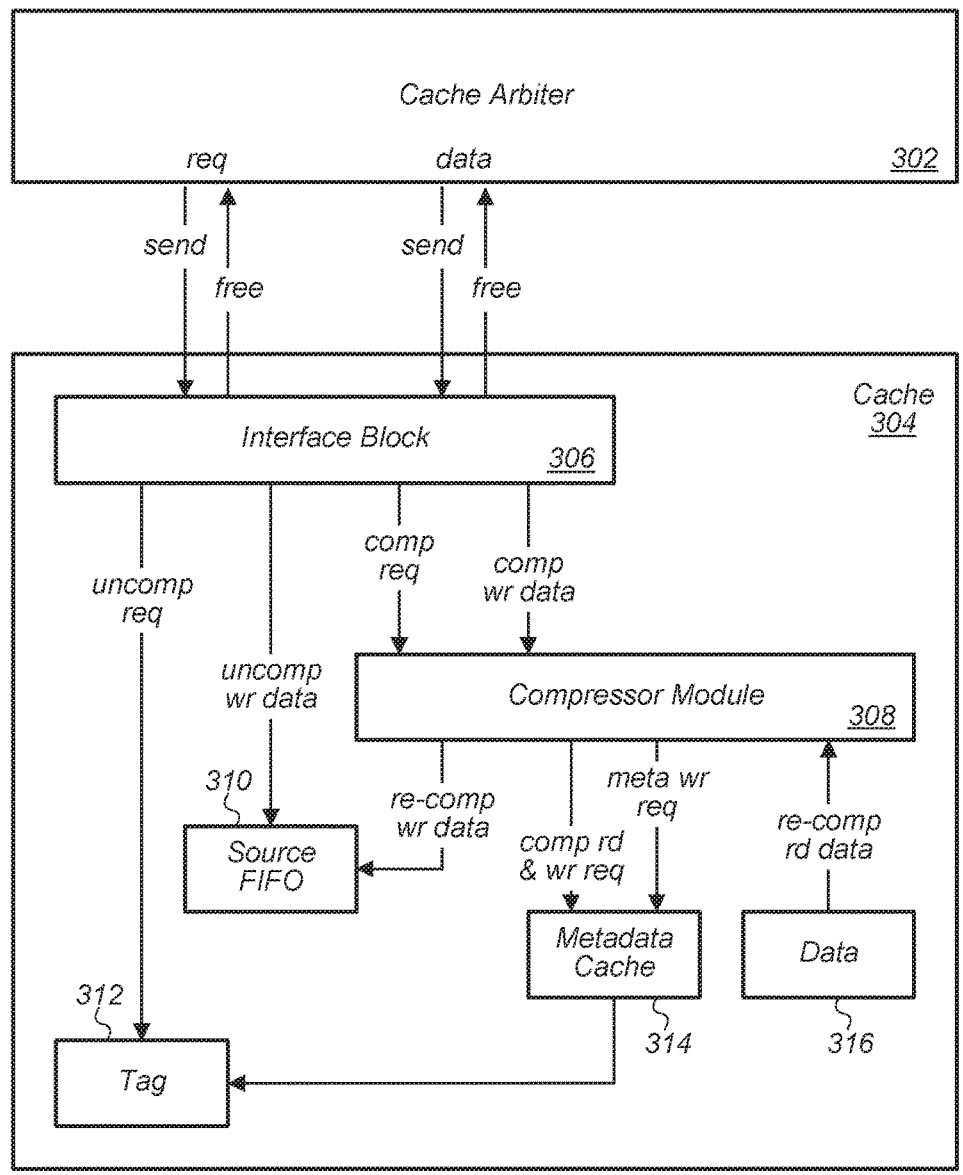
FIG. 3 is a block diagram of one embodiment of a cache arbiter and a cache.

Referring now to FIG. 3, a block diagram of one embodiment of a cache arbiter 302 and a cache 304 is shown. In one embodiment, cache arbiter 302 is coupled to interface block 306 of cache 304. Cache arbiter 302 is configured to convey read and write requests to interface block 306 for requests targeting data stored in cache 304. Interface block 306 conveys requests targeting uncompressed surfaces to tag array 312 and requests targeting compressed surfaces to compressor module 308. The uncompressed write data is conveyed to source first-in, first-out module (FIFO) 310.

Compressor module 308 performs a lookup of metadata cache 314 to determine if and how a given block of a targeted surface is compressed. Compressor module 308 receives data from data array 316 and then compressor module 308 decompresses the compressed data. In one embodiment, compressor module 308 merges write data with data from a given surface block that has been decompressed. Then, compressor module 308 recompresses the merged data and sends the recompressed merged data to source FIFO 310. It is noted that in other embodiments, logic for managing writes to compressed blocks of surfaces, decompressing data, merging data, and compressing data can be organized in other manners within cache 304.

Figure 4:
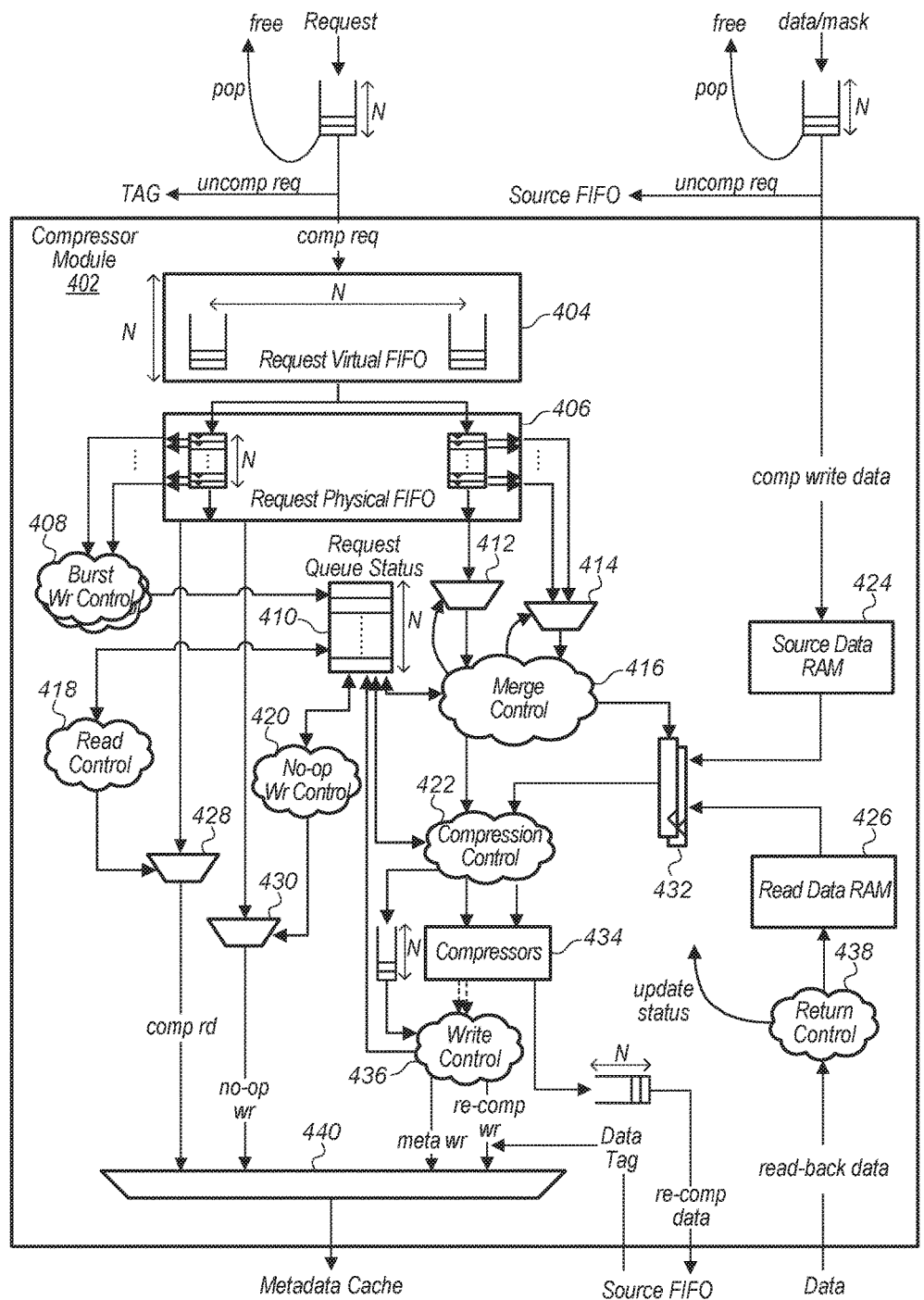
FIG. 4 is a block diagram of one embodiment of a compressor module.

Turning now to FIG. 4, a block diagram of one embodiment of a compressor module 402 is shown. In one embodiment, the components of compressor module 402 are included in compressor module 308 (of FIG. 3). Requests targeting compressed surfaces are conveyed to virtual FIFO 404, while requests targeting uncompressed surfaces are conveyed to the tag array (not shown). Virtual FIFO 404 maintains addresses of requests ordered with respect to each other. In one embodiment, a linked list structure is utilized to maintain the order of requests with respect to one another in virtual FIFO 404. Virtual FIFO 404 also allows read requests to be prefetched for write requests that target only a portion of a block of a surface. For example, if a request in virtual FIFO 404 requires a read-modify-write on the decompress and merge path, then a prefetch request is generated for the request while the request waits in virtual FIFO 404. In one embodiment, a given number of prefetch requests can be outstanding at any given time, with the given number varying from embodiment to embodiment. When the prefetch requests come back, the data is merged and arbitrates for the compressors 434. If a write request stored in virtual FIFO 404 will fully overwrite the entire targeted block, then a read request is not generated to prefetch the block from the cache before processing the request. Requests are drained from virtual FIFO 404 into physical FIFO 406. In one embodiment, physical FIFO 406 is a flop-based FIFO.

If a write request will overwrite the entire block of the surface, then a prefetch request is not generated, and the write request arbitrates for one of the compressors 434. Then, the source data is fetched out of source data RAM 424 that the request had initially written into source data RAM 424. Then, the source data is written out on the path to the cache. For write requests that only target a portion of the targeted block, prefetch read requests are generated which read the other portions of the targeted block from the cache. The read-back data is conveyed to return control logic 438 and then to read data RAM 426 and flops 432.

Request physical FIFO 406 is coupled to burst write control 408 and multiplexers (or muxes) 412, 414, 428, and 430. Read control logic 418 and no-op write control logic 420 provide the select signals for muxes 428 and 430, respectively. Merge control logic 416 provides the select signals for muxes 412 and 414. For write requests with data that only overwrites a portion of the targeted block, merge control logic 416 is configured to merge the write data with the other unaffected portions of the targeted block. Merge control logic 416 is coupled to request queue status 410, muxes 412 and 414, flops 432, and compression control logic 422. The merged data is coupled to compression control logic 422 and then compressors 434 for compression before being written to the cache. Compressors 434 are also coupled to write control logic 436, which is coupled to mux 440, with the output of mux 440 coupled to the metadata cache (not shown).

It is noted that the letter "N" when displayed herein next to various structures is meant to generically indicate any number of elements for that structure (e.g., any number of storage elements in request virtual FIFO 404, including one storage element). Additionally, different references within FIG. 4 that use the letter "N" (e.g., virtual FIFO 404 and request queue status 410) are not intended to indicate that equal numbers of the different elements are provided (e.g., the number of storage elements in request virtual FIFO 404 can differ from the number of storage elements of request queue status 410).

Figure 5:
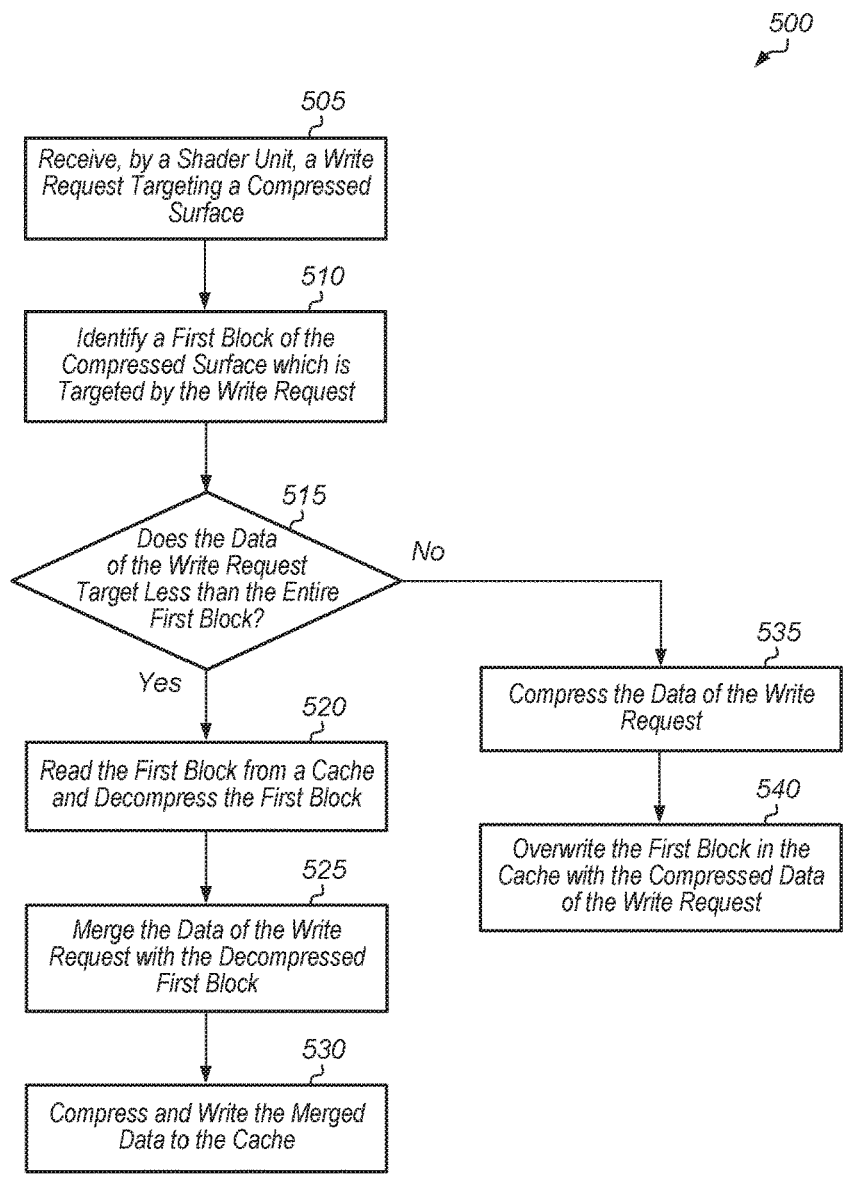
FIG. 5 is a generalized flow diagram illustrating one embodiment of a method for performing a write to a compressed surface.
Figure 6:
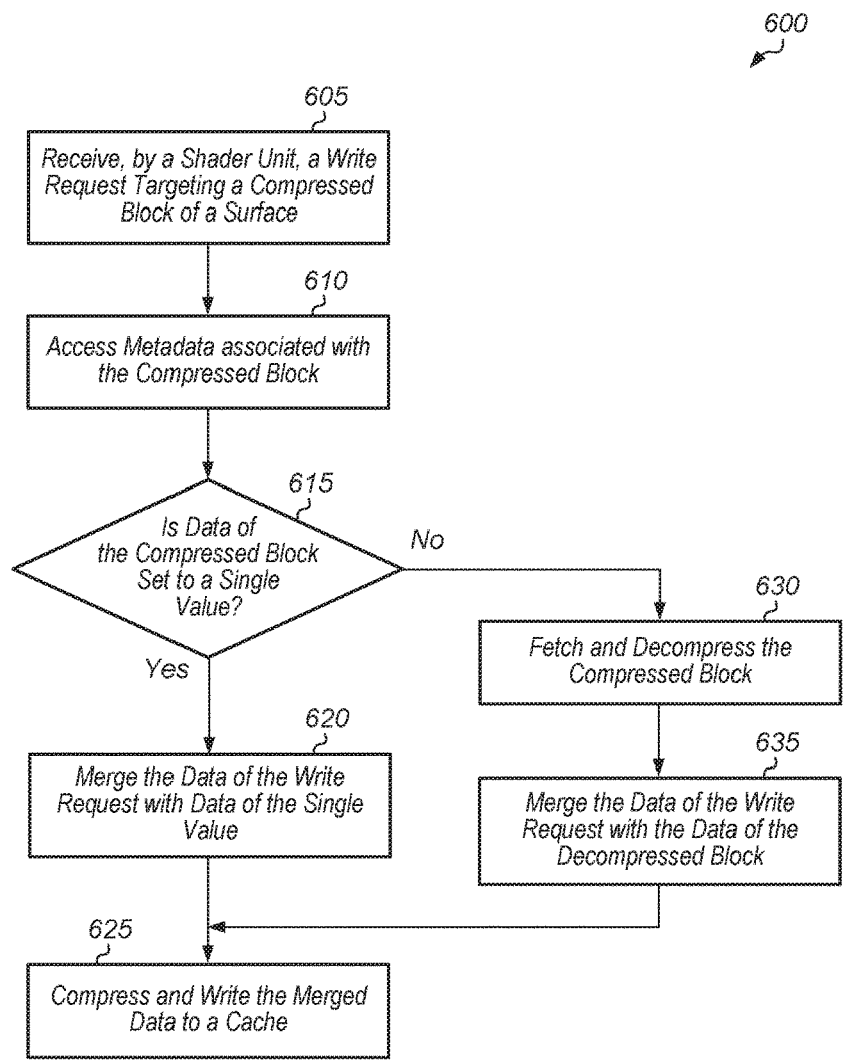
FIG. 6 is a generalized flow diagram illustrating one embodiment of a method for processing a write request to a compressed block of a surface.
Figure 7:
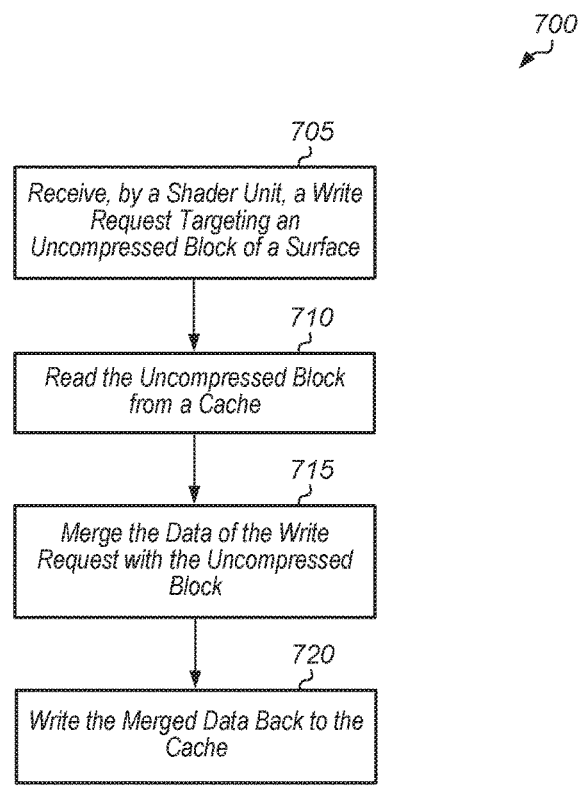
FIG. 7 is a generalized flow diagram illustrating one embodiment of a method for processing a write request to an uncompressed block of a surface.
Figure 8:
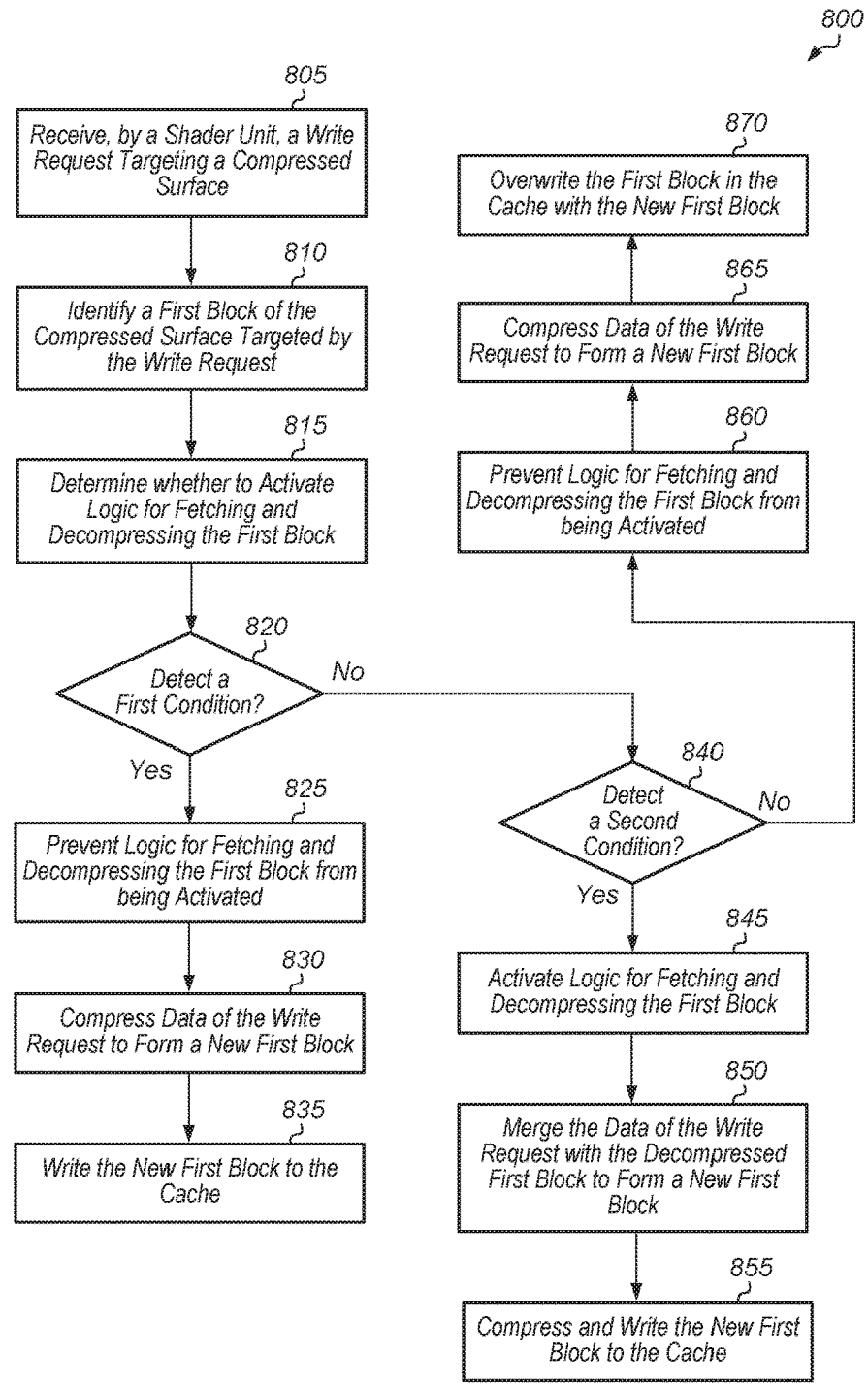
FIG. 8 is a generalized flow diagram illustrating another embodiment of a method for performing a write to a compressed surface.

Referring now to FIG. 5, one embodiment of a method 500 for performing a write to a compressed surface is shown. For purposes of discussion, the steps in this embodiment and those of FIGS. 6-8 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 500.

A shader unit of a processor receives a write request targeting a compressed surface (block 505). The processor includes any number of shader units, depending on the embodiment. Next, the shader unit identifies a first block of the compressed surface which is targeted by the write request (block 510). In one embodiment, the surface is partitioned into a plurality of blocks, with each of the blocks compressed independently of the other blocks. It is noted that a "block" of a surface can also be referred to as a "portion" of a surface herein.

Then, the shader unit determines if data of the write request targets less than an entirety of the first block (conditional block 515). If the data of the write request targets less than an entirety of the first block (conditional block 515, "yes" leg), then the shader unit reads the first block from a cache and decompresses the first block (block 520). In another embodiment, the shader unit reads the first block from a memory. Next, the shader unit merges the data of the write request with the decompressed first block (block 525). Then, the shader unit compresses and writes the merged data to the cache (block 530). In another embodiment, the shader unit writes the merged data to the memory.

If data of the write request targets the entirety of the first block (conditional block 515, "no" leg), then the shader unit compresses the data of the write request (block 535). In this case, the shader unit skips the steps of fetching the first block from the cache and decompressing the first block. Next, the first shader overwrites the first block in the cache with the compressed data of the write request (block 540). After blocks 530 and 540, method 500 ends.

Turning now to FIG. 6, one embodiment of a method 600 for processing a write request to a compressed block of a surface is shown. A shader unit of a processor receives a write request targeting a compressed block of a surface (block 605). In response to receiving the write request, the shader unit accesses metadata associated with the compressed block (block 610). In one embodiment, the metadata includes information specifying a type of compression used to compress the first block. In one embodiment, delta color compression (DCC) is the type of compression used to compress the first block. In one embodiment, the metadata is stored in a metadata cache.

Next, the shader unit determines, from the metadata, if the data of the compressed block is set to a single value (conditional block 615). In one embodiment, when the compressed block is compressed using DCC, a clear setting indicates that the compressed block is set to a single value (e.g., 0.0, 1.0). It is assumed for the purposes of this discussion that the data of the write request does not overwrite the entirety of the compressed block. If the compressed block is set to a single value (conditional block 615, "yes" leg), then the shader unit merges the data of the write request with data of the single value (block 620). Next, the shader unit compresses and writes the merged data to a cache (block 625). If the compressed block is not set to a single value (conditional block 615, "no" leg), then the shader unit fetches and decompresses the compressed block (block 630). Next, the shader unit merges the data of the write request with the data of the decompressed block (block 635). Then, the shader unit compresses and writes the merged data to the cache (block 625). After block 625, method 600 ends.

Referring now to FIG. 7, one embodiment of a method 700 for processing a write to an uncompressed block of a surface is shown. A shader unit of a processor receives a write request targeting an uncompressed block of a surface (block 705). Next, the shader unit reads the uncompressed block from a cache (block 710). Then, the shader unit merges the data of the write request with the uncompressed block (block 715). It is assumed for the purposes of this discussion that the data of the write request does not overwrite the entirety of the compressed block. However, if the data of the write request overwrites the entirety of the compressed block, then blocks 710 and 715 can be skipped. Next, the shader unit writes the merged data back to the cache (block 720). In some cases, the shader unit can compress the merged data and then write the compressed merged data back to the cache. After block 720, method 700 ends.

Turning now to FIG. 8, another embodiment of a method 800 for performing a write to a compressed surface is shown. A shader unit receives a write request targeting a compressed surface (block 805). The shader unit identifies a first block of the compressed surface targeted by the write request (block 810). Next, the shader unit determines whether to activate logic for fetching and decompressing the first block (block 815). In one embodiment, the determination for whether to activate the logic for fetching and decompressing the first block is based on the detection of one or more conditions.

If the shader unit detects a first condition (conditional block 820, "yes" leg), then the shader unit prevents the logic for fetching and decompressing the first block from being activated (block 825). In one embodiment, the first condition is determining that all data of the first block is set to a single value. In one embodiment, the shader unit determines that all data of the first block is set to a single value by retrieving metadata associated with the first block. The single value can be 0.0, 1.0, or another value in between. If the metadata indicates that the data of the first block is clear, then this indicates that the first block is set to a single value. In another embodiment, the first condition is determining that data of the write request updates an entirety of the first block. In other embodiments, the first condition can include other events and/or indications.

After block 825, the shader unit compresses data of the write request to form a new first block (block 830). In one embodiment, the data of the write request can also be referred to as "pixel data" or "pixels". Next, the shader unit writes the new first block to the cache (block 835). Depending on the embodiment, the shader unit can compress or not compress the new first block prior to writing the new first block to the cache.

If the shader unit does not detect the first condition (conditional block 820, "no" leg), then the shader unit determines if a second condition is detected (conditional block 840). In one embodiment, the second condition is determining that data of the write request targets less than an entirety of the first block. In other embodiments, the second condition can include other events and/or indications. If the second condition is detected (conditional block 840, "yes" leg), then the shader unit activates logic for fetching and decompressing the first block (block 845). Next, the shader unit merges the data of the write request with the decompressed first block to form a new first block (block 850). Then, the shader unit compresses and writes the new first block to the cache (block 855).

If the second condition is not detected (conditional block 840, "no" leg), then the shader unit prevents the logic for fetching and decompressing the first block from being activated (block 860). In one embodiment, if the second condition is not detected, then this indicates that the data of the write request targets the entirety of the first block. After block 860, the shader unit compresses data of the write request to form a new first block (block 865). Then, the shader unit overwrites the first block in the cache with the new first block (block 870). After blocks 835, 855, and 870, method 800 ends.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:
a cache; and
one or more shader units coupled to the cache;
wherein responsive to a write request targeting a compressed surface, a shader unit of the one or more shader units is configured to:
identify a first block of the compressed surface targeted by the write request;
responsive to detecting all data of the first block is set to a single value:
prevent logic for fetching and decompressing the first block from being activated;
compress data of the write request to form a second block; and
write the second block to the cache without fetching or decompressing the first block.

2. The processor as recited in claim 1, wherein responsive to detecting that all the data of the first block is set to the single value, the shader unit is configured to merge the data of the write request with the data of the single value prior to compressing the merged data and forming the second block.

3. The processor as recited in claim 1, wherein responsive to determining that the data of the write request updates an entirety of the first block, the shader unit is further configured to overwrite the first block in the cache with the second block.

4. The processor as recited in claim 1, wherein responsive to detecting a second condition, the shader unit is configured to:
activate logic for fetching and decompressing a third block;
merge data of a second write request with the decompressed third block to form a fourth block; and
compress and write the fourth block to the cache.

5. The processor as recited in claim 4, wherein the second condition is determining that the data of the second write request targets less than an entirety of the third block.

6. The processor as recited in claim 5, wherein the shader unit is further configured to access metadata associated with the third block, wherein the metadata includes information specifying a type of compression used to compress the third block.

7. The processor as recited in claim 6, wherein the shader unit is further configured to utilize the information to decompress the third block.

8. A method for use in a computing device, the method comprising:

receiving a write request targeting a compressed surface;
identifying, by a shader unit, a first block of the compressed surface targeted by the write request;
responsive to determining all data of the first block is set to a single value:
preventing, by the shader unit, logic for fetching and decompressing the first block from being activated;
compressing, by the shader unit, data of the write request to form a second block; and
writing, by the shader unit, the second block to a cache without fetching or decompressing the first block.

9. The method as recited in claim 8, wherein responsive to determining that all the data of the first block is set to the single value, the method further comprising merging the data of the write request with the data of the single value prior to compressing the merged data and forming the second block.

10. The method as recited in claim 8, wherein responsive to determining that the data of the write request updates an entirety of the first block, the method further comprising overwriting the first block in the cache with the second block.

11. The method as recited in claim 8, wherein responsive to detecting a second condition, the method further comprising:
activating logic for fetching and decompressing a third block;
merging data of a second write request with the decompressed third block to form a fourth block; and
compressing and writing the fourth block to the cache.

12. The method as recited in claim 11, wherein the second condition is determining that the data of the second write request targets less than an entirety of the third block.

13. The method as recited in claim 12, further comprising accessing metadata associated with the third block, wherein the metadata includes information specifying a type of compression used to compress the third block.

14. The method as recited in claim 13, further comprising utilizing the information to decompress the third block.

15. A system comprising:
a memory; and
a processor coupled to the memory, wherein the processor comprises one or more shader units;
wherein responsive to a write request targeting a compressed surface, a shader unit of the one or more shader units is configured to:
identify a first block of the compressed surface targeted by the write request;
responsive to detecting all data of the first block is set to a single value:
prevent logic for fetching and decompressing the first block from being activated;
compress data of the write request to form a second block; and
write the second block to the memory without fetching or decompressing the first block.

16. The system as recited in claim 15, wherein responsive to detecting that all the data of the first block is set to the single value, the shader unit is configured to merge the data of the write request with the data of the single value prior to compressing the merged data and forming the second block.

17. The system as recited in claim 15, wherein responsive to determining that the data of the write request updates an entirety of the first block, the shader unit is further configured to overwrite the first block in the memory with the second block.

18. The system as recited in claim 15, wherein responsive to detecting a second condition, the shader unit is configured to:
- activate logic for fetching and decompressing a third block;
- merge data of a second write request with the decompressed third block to form a fourth block; and
- compress and write the fourth block to the memory.

19. The system as recited in claim 18, wherein the second condition is determining that the data of the second write request targets less than an entirety of the third block.

20. The system as recited in claim 19, wherein the shader unit is further configured to access metadata associated with the third block, wherein the metadata includes information specifying a type of compression used to compress the third block.

* * * * *